(12) United States Patent
Sahlin et al.

(10) Patent No.: US 7,839,806 B2
(45) Date of Patent: Nov. 23, 2010

(54) ETHERNET COMMUNICATION DEVICE ON COAXIAL CABLE

(75) Inventors: Dan Sahlin, Stockholm (SE); Peter Fagerlin, Huddinge (SE)

(73) Assignee: Teleste OYJ, Littoinen (FI)

( * ) Notice: Subject to any disclaimer, the term of this patent is extended or adjusted under 35 U.S.C. 154(b) by 0 days.

(21) Appl. No.: 11/988,795

(22) PCT Filed: Jul. 14, 2006

(86) PCT No.: PCT/EP2006/064294

§ 371 (c)(1),
(2), (4) Date: Jan. 15, 2009

(87) PCT Pub. No.: WO2007/009962

PCT Pub. Date: Jan. 25, 2007

(65) Prior Publication Data

US 2009/0201836 A1      Aug. 13, 2009

(30) Foreign Application Priority Data

Jul. 18, 2005    (SE)    .................................. 0501692

(51) Int. Cl.
    H04L 5/14    (2006.01)
(52) U.S. Cl. ...................................... 370/276; 370/293
(58) Field of Classification Search ................ 370/401,
    370/402, 286, 279, 285, 290, 291, 293, 465,
    370/276, 466, 467
    See application file for complete search history.

(56) References Cited

U.S. PATENT DOCUMENTS 4,691,233 A * 9/1987 Acampora ............. 375/240.05

| | | | |
|---|---|---|---|
| 5,327,465 A | 7/1994 | Wincn et al. | |
| 6,823,028 B1 | 11/2004 | Phanse | |
| 7,469,808 B2 * | 12/2008 | Morales et al. ............. 224/555 | |
| 2003/0046706 A1 | 3/2003 | Rakib | |
| 2003/0151695 A1 | 8/2003 | Sahlin et al. | |
| 2005/0179473 A1 | 8/2005 | Nagahori et al. | |

FOREIGN PATENT DOCUMENTS

| EP | 1 248 380 A1 | 10/2002 |
|---|---|---|
| WO | WO 00/05895 A1 | 2/2000 |
| WO | WO 01/73954 A2 | 10/2001 |

OTHER PUBLICATIONS

Jack Andresen, "Running 10BaseT Ethernet over existing but unused coax cable" Home Toys Article, Transformation Systems, Feb. 2005, pp. 1-2.
PCT/ISA/210.
PCT/IPEA/416.
International-Type Search Report dated Jan. 13, 2006, issued in corresponding Swedish Application No. 0501692-8.

* cited by examiner

*Primary Examiner*—Brenda Pham
(74) *Attorney, Agent, or Firm*—Buchanan Ingersoll & Rooney PC

(57) ABSTRACT

The inventive communication device for converting a baseband data signal to a baseband signal for a coaxial cable, comprises at least one first input terminal for receiving an incoming baseband data signal, at least a first output terminal for outputting an outgoing baseband data signal, a first input/output terminal for connecting to a coaxial cable for communication of a duplex signal, first rebalancing means for converting said incoming baseband data signal to a balanced input signal, subtraction means for subtracting the balanced input signal from the duplex signal to obtain a balanced output signal, second rebalancing means for converting the balanced output signal to said outgoing baseband data signal.

11 Claims, 4 Drawing Sheets

ETHERNET COMMUNICATION DEVICE ON COAXIAL CABLE

TECHNICAL FIELD

The present invention relates to a communication device as defined in the preamble of claim 1 and to a communication method according to the preamble of claim 8.

BACKGROUND AND PRIOR ART

As use of the Internet gains ground the efficient distribution of Ethernet signals becomes more and more important. New services such as video on-demand, which involve the transmission of large amounts of information, create a need for faster communication to and from private homes as well as work places. Current solutions for broadband data communication often involve modulators which are relatively expensive and complex apparatuses. Thus, there is a need for solutions that are simpler and less expensive than the ones known in the art.

WO 00/05895 discloses an apparatus for providing Ethernet communication in a CATV network by combining baseband Ethernet signals with the CATV signals. The signals are combined by means of filters, and the solution in its simplest form can be implemented using only passive components. This solution may be used both between service providers and subscribers and for shorter range communication, for example, within buildings.

The solution proposed in WO 00/05895 may not work very well for 100 Mbit/s Ethernet, which is more prone to attenuation. 100 Mbit/s Ethernet uses three signal levels and the attenuation may be too strong if the signals are combined according to the prior art solution.

OBJECT OF THE INVENTION

It is an object of the present invention to provide a simple and cost-efficient solution for providing 100 Mbit/s Ethernet with high quality to and/or within buildings.

SUMMARY OF THE INVENTION

This object is achieved according to the invention by a communication device for converting a baseband data signal to a baseband signal for a coaxial cable, comprising
- at least a first input terminal for receiving an incoming baseband data signal,
- at least a first output terminal for outputting an outgoing baseband data signal,
- a first input/output terminal for connecting to a coaxial cable for communication of a duplex signal,
- first rebalancing means for converting said incoming baseband data signal to an unbalanced input signal,
- subtraction means for subtracting the unbalanced input signal from the duplex signal to obtain an unbalanced output signal,
- second rebalancing means for converting the unbalanced output signal to said outgoing baseband data signal.

The object is also achieved according to the invention by a communication method for transmitting baseband data signals on a coaxial cable, comprising the steps of
- Converting an incoming baseband data signal to an unbalanced input signal,
- Transmitting said unbalanced input signal and an unbalanced output signal as a duplex signal on a coaxial cable,
- Subtracting the unbalanced input signal from the duplex signal to obtain the unbalanced output signal
- Converting the unbalanced output signal to an outgoing baseband data signal
- Transmitting the outgoing baseband data signal.

Since the incoming data signal is known, the outgoing data signal can be obtained by subtracting the incoming data signal from the duplex signal, which comprises both the incoming and the outgoing data signals, in opposite directions, on one coaxial cable.

According to the invention both 10 Mbit/s and 100 Mbit/s Ethernet signals can be transmitted in full duplex on coaxial cable in a point-to-point connection. This enables the use of existing coaxial cables in a building, for example cables that are part of a CATV network, for Ethernet communication.

In a preferred embodiment the subtraction means comprises:
- a first operational amplifier arranged to receive the unbalanced input signal and to output a signal proportional to the unbalanced input signal to the input/output terminal, said first transformer means being connected between the first input terminal and the first operational amplifier,
- a second operational amplifier arranged to receive said duplex signal and said output signal from the first operational amplifier and to output a signal proportional to the difference between the duplex signal on the coaxial cable and the output signal from the first operational amplifier, said second transformer means being connected between the output of the second operational amplifier and the first output terminal.

Alternatively, the subtraction means may comprise transformers or signal processor means for performing the subtraction of the signal.

The communication device may further comprising a low-pass filter on its input, either between the first transformer means and the first operational amplifier or between the first input terminal and the first transformer means, for filtering out any undesired high-frequency components of the unbalanced input signal.

In a preferred embodiment, said baseband data signal is an Ethernet signal.

TV signals can be transmitted on the same coaxial cables either as part of the Ethernet signal or multiplexed onto the cable along with the Ethernet baseband signal. In the former case an IPTV unit for converting Ethernet signals to TV signals must be arranged in connection with the TV. In the latter case, frequencies higher than those occupied by the Ethernet signal can be used for TV signals. According to the Ethernet standard the Ethernet signals require a bandwidth of 1 MHz-100 MHz. Thus, it is possible to add TV signals at least in frequencies above 100 MHz. It may also be possible to reduce the bandwidth requirement to below 100 MHz, so that even lower frequencies than 100 MHz can be used for TV signals.

For transmitting CATV signals the communication device may further comprise, or be connected to a diplex filter comprising a low-pass filter connected to said input/output terminal and a high-pass filter arranged to receive a CATV signal, said high-pass filter and low-pass filter being interconnected to form a second output terminal for a combined signal comprising a baseband data signal and a CATV signal.

BRIEF DESCRIPTION OF THE DRAWINGS

The present invention will be described in more detail in the following, with reference to the appended drawings, in which.

DETAILED DESCRIPTION OF EMBODIMENTS

Figure 1:
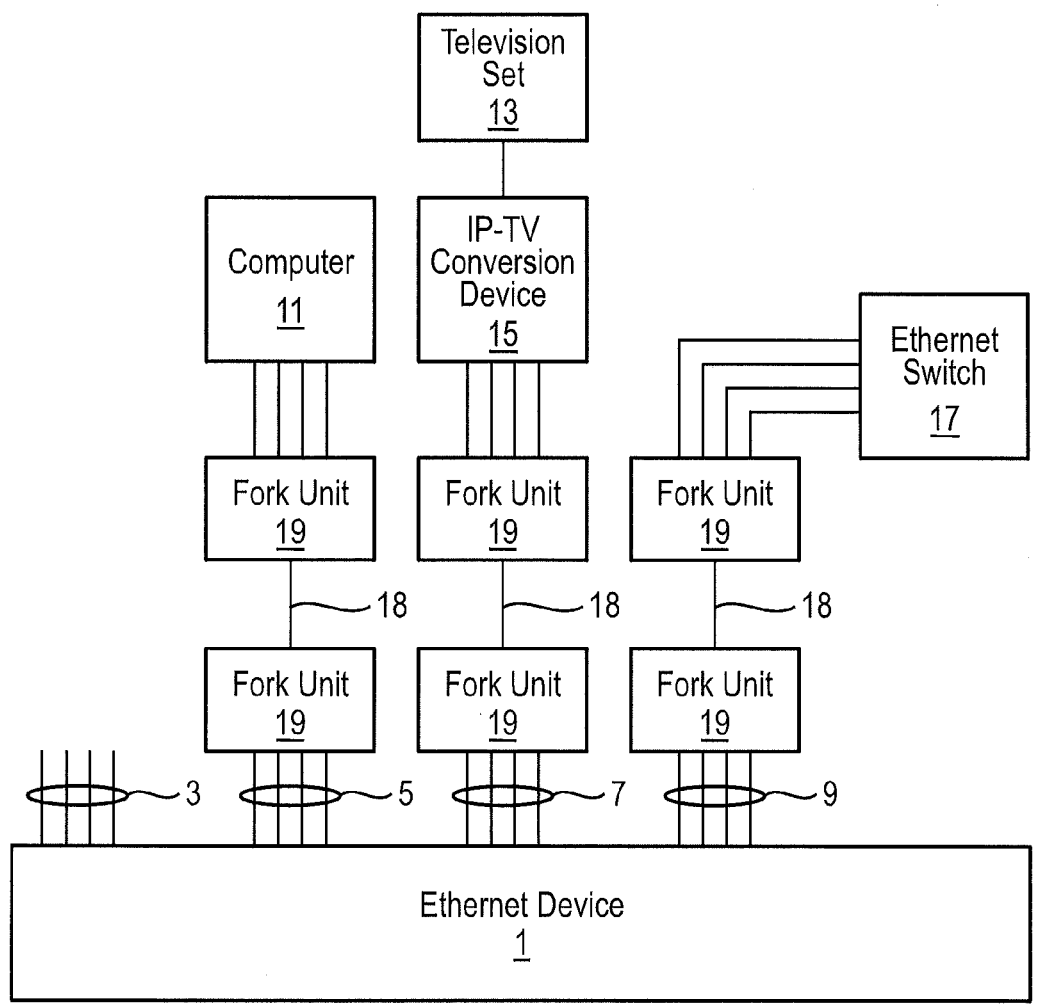
FIG. 1 is an overall view of an in-house network according to an embodiment of the invention using Ethernet.

FIG. 1 shows an overall view of an in-house network using coaxial cables according to an embodiment of the invention. An Ethernet switch 1 comprises four ports 3, 5, 7, 9 for connecting to other external devices. The Ethernet switch 1 on a first port 3 receives incoming signals, for example, from the Internet and transmits outgoing signals to the Internet. Each Ethernet connection comprises four cables, two for the incoming signal and two for the outgoing signal. The Ethernet switch 1 switches the incoming and outgoing signals. On the second port 5 of the Ethernet switch 1 a computer 11, such as a personal computer, is connected and on the third port 7 a television set 13 is connected through an IP-TV unit 15, as will be described in more detail below. On the fourth port 9 another Ethernet switch 17 is connected in order to provide connections to more external devices. Of course this is just an example for illustrative purposes, and any type of device capable of communication according to the Ethernet standard can be connected according to the invention.

Most of the equipment used for 100 Mbit/s Ethernet communication can handle both 10 Mbit/s and 100 Mbit/s. When communication is started the units involved negotiate between them the speed to be used in each case. The speed is adapted to the capacity of the equipment involved, that is, either 10 Mbit/s of 100 bit/s. It would be possible, although probably not practical, to adapt all equipment to handle 100 Mbit/s only.

According to the invention each of the devices 11, 15, 17 is connected to the Ethernet switch through a coaxial cable 18, which transmits a duplex signal comprising both the incoming data signal and the outgoing data signal. The coaxial cable 18 is connected to the Ethernet switch 1, as well as to its respective external device 11, 15, 17, through fork units 19 that will be described in more detail in connection with FIG. 2.

In FIG. 1, the television set 13 is connected to the fork unit 19 through an IP-TV conversion device 15, which is arranged to receive the Ethernet signal from the fork unit and output a television signal to the television set 13. Such an IP-TV conversion device is known in the art and will not be discussed in any detail here.

Figure 2:
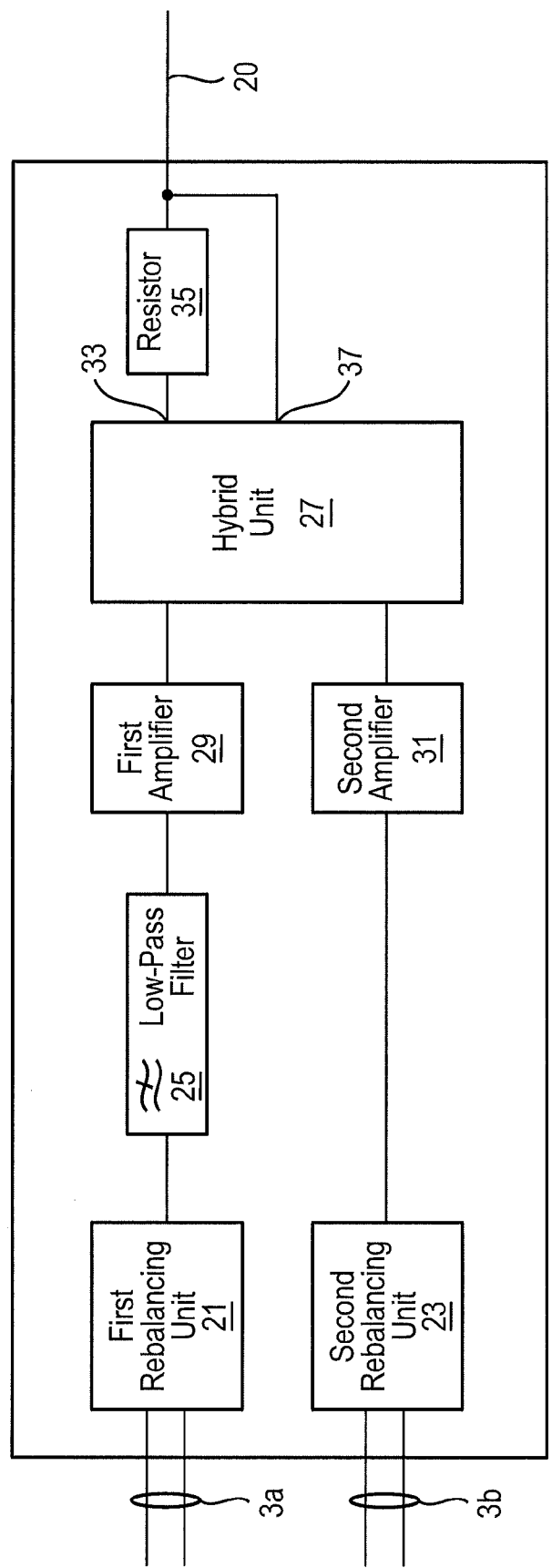
FIG. 2 illustrates a connection according to the invention.

FIG. 2 illustrates schematically a fork unit 19 according to the invention, for converting between Ethernet signals and signals that can be transmitted on a coaxial cable, and vice versa. At the other end of the coaxial cable another fork unit (not shown) is connected, to provide connection to an external device. As mentioned above, on the Ethernet side of the fork unit 19, there are four connectors, two input connectors 3a for the incoming data signal and two output connectors 3b for the outgoing data signal. The fork unit 19 also has an input/output terminal 20 connected to a coaxial cable for the combined incoming and outgoing data signal.

The fork unit 19 performs two principal functions: rebalancing and combination of the signals. On the incoming signal a low-pass filtering is preferably performed after rebalancing and before combining it with the outgoing signal, in order to filter out any high-frequency disturbances that may occur. On the outgoing signal such filtering is not needed.

The purpose of the rebalancing is to convert between the Ethernet signal, which is a balanced signal, and an unbalanced signal that can be transmitted on a coaxial cable. This means that the Ethernet signal is not related to earth but is constituted by the voltage difference between the two input connectors and between the two output connectors, respectively. The magnitude of the voltage relative to earth is not significant. The signal on the coaxial cable, on the other hand, must be an unbalanced signal, that is a signal that is determined relative to earth level.

The conversion between a balanced and an unbalanced signal in this embodiment is performed by transformers. It can also be performed by active components such as operational amplifiers. For the incoming signal it is performed by a first rebalancing unit 21 connected to the input connectors 3a and for the outgoing signal it is performed by a second rebalancing unit 23 connected to the output connectors 3b. As mentioned above, the unbalanced input signal is preferably fed from the first rebalancing unit 21 to a low-pass filter 25 for filtering out any undesired high-frequency components. The term rebalancing is used to enhance the understanding that conversion can be in both directions, that is, from a balanced to an unbalanced signal and vice versa.

Figure 3:
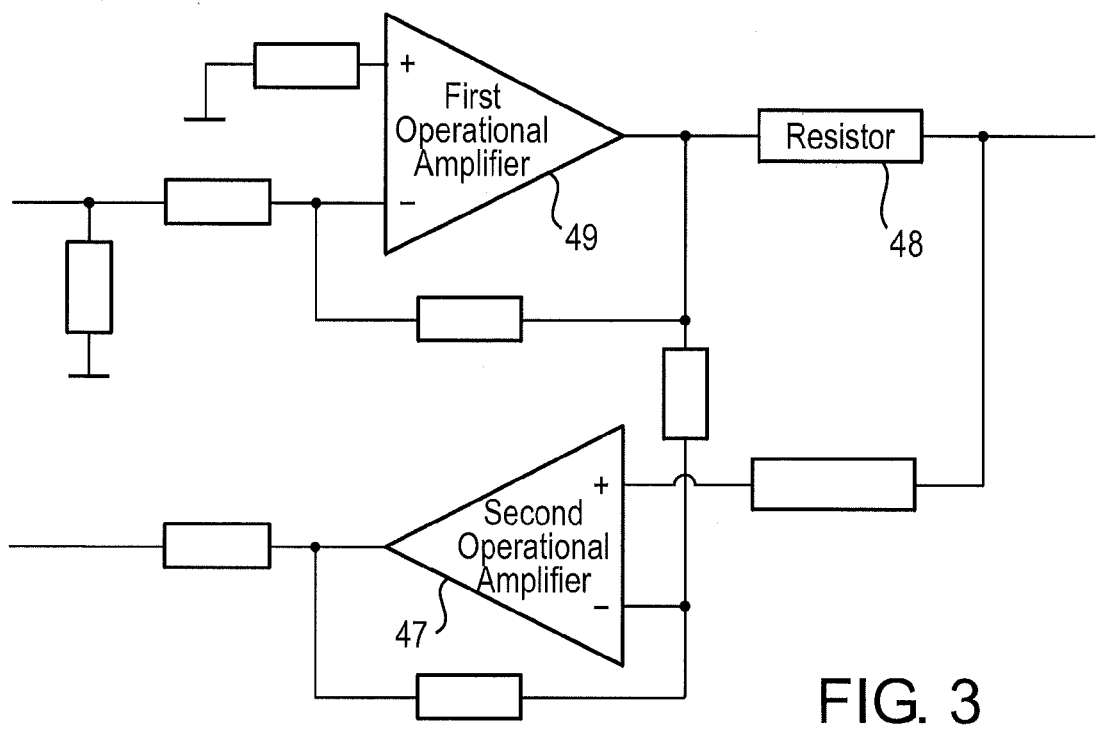
FIG. 3 is a schematic overall diagram of a fork unit according to the invention

The actual combination of the signals in order to transmit them on one single coaxial cable is done by a hybrid unit 27. Between the hybrid unit 27 and the first 21 and second 23 rebalancing unit, respectively, a first 29 and a second 31 amplifier may be connected. These amplifiers 29, 31 are not needed but may be useful for adjusting the signal level. The hybrid unit 27 can be implemented in several different ways, using different types of units. One detailed embodiment using operational amplifiers is illustrated in FIG. 3. Other embodiments using operational amplifiers are possible, as well as transformers or signal processing devices.

The combined signal, also called the duplex signal, on the coaxial cable comprises the unbalanced input signal and the unbalanced output signal. On the output 33 from the hybrid unit there is a resistor 35 for impedance matching with the coaxial cable, as will be discussed in more detail below. The other side of the resistor 35 is connected to a second input terminal 37 of the hybrid unit. Hence, this second input terminal receives the combined signal which is present on the coaxial cable. The hybrid unit 27 subtracts the unbalanced input signal from the combined signal. The resulting signal from the subtraction is the unbalanced output signal, which is output to the rebalancing unit 23, through the amplifier 31 if present. The rebalancing unit 23 converts the unbalanced output signal to a balanced outgoing signal according to the Ethernet standard.

Thus, the coaxial cable 18 will transmit in full duplex, an incoming signal corresponding to the Ethernet signal received on the input connectors 3a and an outgoing signal corresponding to an Ethernet signal travelling in the opposite direction from the fork unit at the other end of the coaxial cable.

The hybrid unit, whose main function is to subtract the unbalanced incoming signal from the combined signal, can be implemented in a number of different ways, for example, using operational amplifiers. It may also be implemented using passive components, such as transformers, or using a digital signal processor (DSP).

FIG. 3 illustrates an embodiment of the hybrid unit 27, implemented using operational amplifiers.

The output from the hybrid unit has a low impedance, to enable high currents. Therefore, a resistor is connected on the output. The resistor should have the same impedance as the coaxial cable, which may be, for example, 75Ω. It should be noted that the resistor in this document is described as not being part of the hybrid unit 27. In some contexts similar hybrid units are described as comprising the resistor as well.

A first operational amplifier 47 receives on its inverting input the signal from the low-pass filter 25 or the first transformer 21 (not shown in FIG. 3). The non-inverting input of the operational amplifier is connected to earth, via a resistor, and its output signal is proportional to the signal received on the input connectors 3a of the fork unit. On the output terminal of the first operational amplifier 47 a resistor 48 is connected, which, as described above, should have the same impedance as the coaxial cable.

A second operational amplifier 49 receives on its non-inverting input the signal coming from the coaxial cable 18 and on its inverting input the output signal from the first operational amplifier 47, that is, from between the first operational amplifier 47 and the resistor 48. In this way, the output from the second operational amplifier 49 will correspond to the output signal coming from the other fork unit connected at the other end of the coaxial cable 18.

Resistors are also connected, as is common in the art, between the inverting input and the output of the first amplifier 47, between the inverting input and the output of the second amplifier 49 and on the non-inverting input of the second operational amplifier 49. These resistors are used to achieve correct amplification by the amplifiers 47, 49 and for impedance adjustment.

Figure 4:
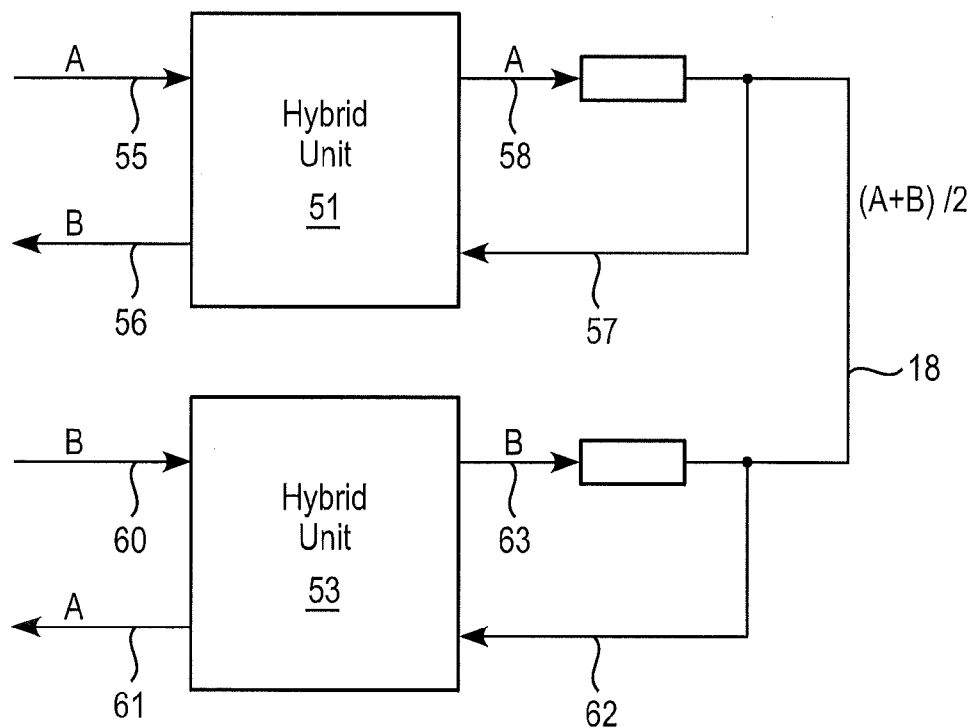
FIG. 4 shows an embodiment of the fork unit of FIG. 3 using operational amplifiers

FIG. 4 illustrates a simpler embodiment in which the incoming/outgoing signals are kept as unbalanced signals. This may be because the incoming and outgoing baseband data signals are in fact unbalanced signals. Alternatively, rebalancing units may be provided outside the hybrid units shown in FIG. 4.

In FIG. 4, two cooperating hybrid units 51, 53, each such as the one 27 shown in FIG. 2, are connected so as to mirror each other at either end of a coaxial cable. The first hybrid unit 51 has a first input terminal 55 and a first output terminal 56 for transmitting and receiving unidirectional data signals, and a second input terminal 57 and a second output terminal 58 for transmitting and receiving the duplex signal between the hybrid units to and from the second hybrid unit 53. The second hybrid unit 53 has a first input terminal 60 and a first output terminal 61 for transmitting and receiving unidirectional data signals, and a second input terminal 62 and a second output terminal 63 for transmitting and receiving the duplex signal between the hybrid units to and from the first hybrid unit 51.

In this case, the incoming data signal A is received on the first input terminal 55 of the first hybrid unit 51 and output again from the first output terminal 61 of the second hybrid unit 53 connected to the first hybrid unit 51. The outgoing data signal B from the first hybrid unit 51 is received from the second hybrid unit 51, which receives this signal B as an input signal on its first input terminal 60. Thus, between the first and the second hybrid units 51, 53, a combined signal, which is essentially (A+B)/2, comprising the incoming signal A and the outgoing signal B travel, in opposite directions, on the same coaxial cable 18. Because of the attenuation k of the coaxial cable 18, near the first hybrid unit 51 the signal B will be an attenuated signal kB, and the combined signal will be (A+kB)/2. Near the second hybrid unit 53 the signal A will be an attenuated signal kA, and the combined signal will be (kA+B)/2, however, this is not reflected in the Figure.

In the first hybrid unit 51 the incoming signal A is known and the outgoing data signal B (which is the input signal to the second hybrid unit 53) can be retrieved by multiplying the combined signal. (A+B)/2 by two and subtracting the incoming signal A. In the second hybrid unit 53 the outgoing data signal B is known, and the incoming signal A (which is to be output from the second hybrid unit 53) can be retrieved by multiplying the combined signal (kA+B)/2 by 2 and subtracting the outgoing signal B. The resulting signals kA and kB can be amplified by a suitable factor to produce the incoming signal A and the outgoing signal B, respectively.

It has been mentioned above that the hybrid unit could be implemented using passive or active components. It would be possible to use two different hybrid units together, for example to use passive components at one end and active components at the other end. If active components are used in the hybrid unit the separation of the signals will be more ideal and less prone to misadjustments. There will be less attenuation, and an amplification will be possible if desired. Using one passive and one active hybrid unit the imperfection of the passive unit may be partly compensated for by the active unit.

Figure 5:
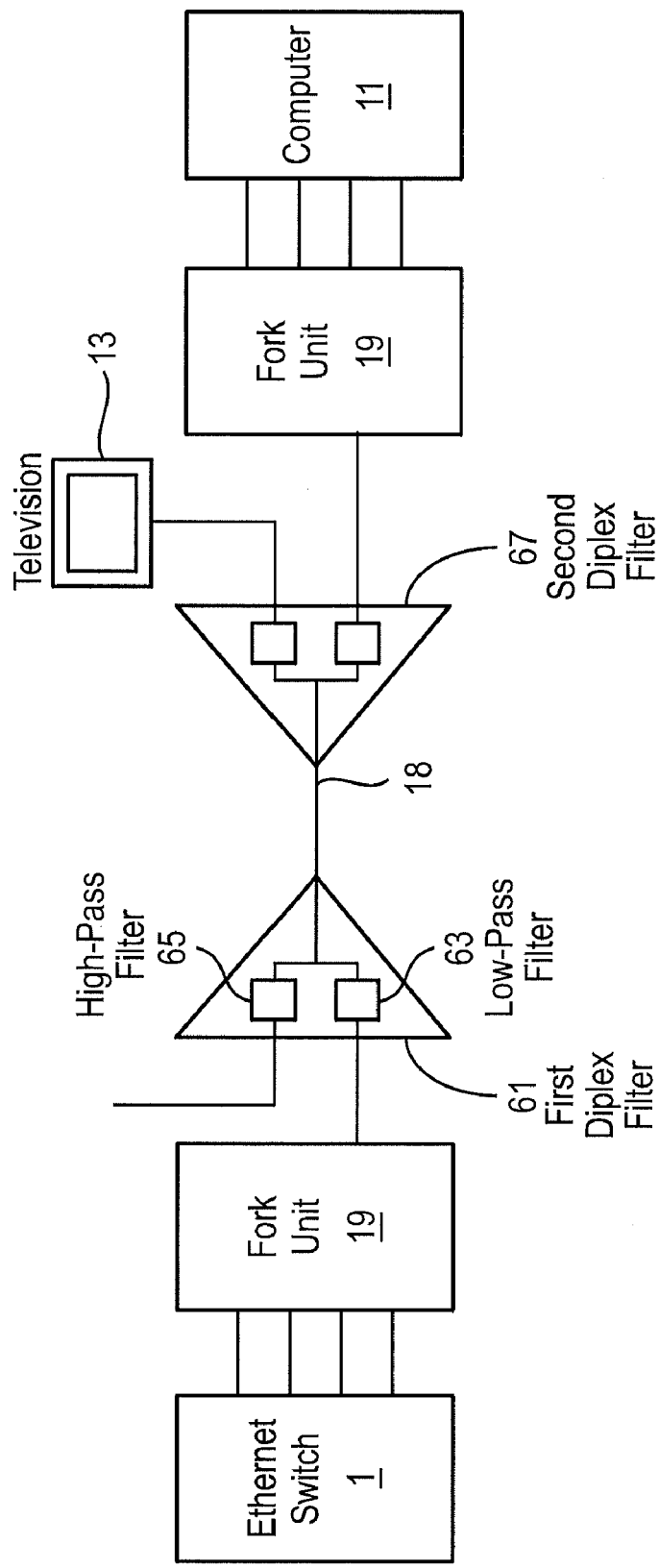
FIG. 5 illustrates an alternative way of connecting a television set according to the invention.

FIG. 5 shows, schematically an alternative way of connecting a television set to the arrangement. In FIG. 5, as in FIG. 1, an Ethernet switch 1 distributes signals to and from a number of external devices, but for simplicity only one port of the Ethernet switch is shown. As before, the four connectors of the port are connected to a fork unit 19, like the one described above, which is in turn connected to a coaxial cable 18 through a first diplex filter 61. The diplex filter comprises a low-pass filter 63 on a first input connected to the fork unit 19, and a high-pass filter 65 on a second input arranged to receive a TV signal. On the output of the diplex filter 61 the combined signal comprising the converted Ethernet signal and the TV signal is output. The other end of the coaxial cable is connected to another fork unit 19 through a second diplex filter 67 similar to the first diplex filter 61. The first output, having a low-pass filter provides the part of the coaxial cable signal corresponding to the Ethernet signal to the fork unit 19 and the second output, having a high-pass filter, provides the TV signal to the television set 13. From the fork unit 69 the Ethernet signal can be fed to any type of external device as described above. In FIG. 5 the external device is a computer 11.

An alternative way of transmitting a 100 Mbit/s Ethernet signal on a coaxial cable in full duplex will be disclosed in the following.

A CAT5e cable intended for 1 Gbit Ethernet, known as 1000BASE-T, comprises four pairs of cables, each having a capacity of 250 Mbit/s in duplex and transmitting a balanced signal on one cable in each direction. An integrated circuit is provided at each end of the CAT5e cable that will convert an incoming signal to a balanced signal to be transmitted on the four cable pairs. According to the invention only one of the cable pairs is used, and its clock rate is reduced by a factor 0.4, to 100 Mbit/s. In this way a balanced duplex signal of 100 Mbit/s is achieved, which can be rebalanced to an unbalanced signal which can be transmitted on a coaxial cable. The rebalancing unit and the integrated circuit then perform the same function as the fork unit shown in FIG. 2.

This use of the CAT5e cable requires modification of the integrated circuit used at each end of the cable, which must be adapted to allow traffic only on one cable pair. The integrated circuit should also be modified to use a lower clock rate. Alternatively, the higher clock rate of 250 Mbit/s may be used, which would require a higher bandwidth.

The invention claimed is:

1. A communication device for converting a baseband data signal to a baseband signal for a coaxial cable, comprising—
at least one first input terminal for receiving an incoming baseband data signal,
at least a first output terminal for outputting an outgoing baseband data signal,
a first input/output terminal for connecting to a coaxial cable for communication of a duplex signal,
first rebalancing means for converting said incoming baseband data signal to an unbalanced input signal,
subtraction means for subtracting the unbalanced input signal from the duplex signal to obtain an unbalanced output signal,
second rebalancing means for converting the unbalanced output signal to said outgoing baseband data signal.

2. The communication device according to claim 1, wherein the subtraction means comprises:
a first operational amplifier arranged to receive the unbalanced input signal and to output a signal proportional to the unbalanced input signal to the input/output terminal, said first rebalancing means being connected between the first input terminal and the first operational amplifier,
a second operational amplifier arranged to receive said duplex signal and said output signal from the first operational amplifier and to output a signal proportional to the difference between the duplex signal on the coaxial cable and the output signal from the first operational amplifier, said second rebalancing means being connected between the output of the second operational amplifier and the first output terminal.

3. The communication device according to claim 1, wherein the subtraction means comprises transformers for performing the subtraction of the signal.

4. The communication device according to claim 1, wherein the subtraction means comprises signal processor means for performing the subtraction of the signal.

5. The communication device according to claim 2, further comprising a low-pass filter either between the first rebalancing means and the first operational amplifier or between the first input terminal and the first rebalancing means, for filtering out any undesired high-frequency components of the unbalanced input signal.

6. The communication device according to claim 1, further comprising a diplex filter comprising a low-pass filter connected to said input/output terminal and a high-pass filter arranged to receive a CATV signal, said high-pass filter and low-pass filter being interconnected to form a second output terminal for a combined signal comprising a baseband data signal and a CATV signal.

7. The communication device according to claim 1, wherein said baseband data signal is an Ethernet signal.

8. A communication method for transmitting baseband data signals on a coaxial cable, comprising the steps of
Converting an incoming baseband data signal to an unbalanced input signal,
Transmitting said unbalanced input signal and an unbalanced output signal as a duplex signal on a coaxial cable,
Subtracting the unbalanced input signal from the duplex signal to obtain the unbalanced output signal,
Converting the unbalanced output signal to an outgoing baseband data signal, and
Transmitting the outgoing baseband data signal.

9. The method according to claim 8 further comprising the step of low-pass filtering the unbalanced input signal before feeding it to the first operational amplifier.

10. The method according to claim 8, wherein said baseband data signal is an Ethernet signal.

11. The method according to claim 8, wherein said baseband data signal is an Ethernet signal.

* * * * *